United States Patent [19]

Wennerblom et al.

[11] 3,940,352

[45] Feb. 24, 1976

[54] PROCESS FOR PREPARATION OF LIGNIN RESIN

[75] Inventors: Axel Bengt Wennerblom, Pitea; Alf Hugo Karlsson, Njurunda, both of Sweden

[73] Assignee: AB Casco, Stockholm, Sweden

[22] Filed: Feb. 21, 1974

[21] Appl. No.: 444,447

[30] Foreign Application Priority Data

Feb. 21, 1973  Sweden.............................. 7302412

[52] U.S. Cl. ................................................ 260/17.5
[51] Int. Cl. ...................... C08g 14/14; C08h 5/02
[58] Field of Search ..................................... 260/17.5

[56] References Cited

UNITED STATES PATENTS

| | | | |
|---|---|---|---|
| 2,282,518 | 5/1942 | Hochwalt............................ | 260/17.5 |
| 2,794,790 | 6/1957 | Marshall et al..................... | 260/17.5 |
| 3,227,667 | 1/1966 | Moffitt et al........................ | 260/17.5 |

*Primary Examiner*—Donald E. Czaja
*Assistant Examiner*—E. A. Nielsen
*Attorney, Agent, or Firm*—Fred Philpitt

[57]  ABSTRACT

The present invention relates to a new process for preparation of lignin resin, i.e., thermosetting resin based on lignin, particularly from sulfite waste liquor, which resin for example can be used as a binder in particle board.

7 Claims, No Drawings

PROCESS FOR PREPARATION OF LIGNIN RESIN

BACKGROUND

During sulfite cooking about half of the solid wood substance (on the average) is chemically transformed by sulfonation, hydrolysis and oxidation to water soluble products, which are contained in the waste liquor. More than half of this dissolved organic wood substance is made up of lignin in the form of lignosulfonates. The lignin present in the waste liquors is therefore not the original lignin of the wood but a lignin derivative having properties which require a further chemical transformation in order to be useful.

Lignin, like phenol, easily form condensation products with carbonyl compounds such as formaldehyde. Unlike the phenols, the lignin, on account of its high degree of polymerization, contains fewer phenolic hydroxyl-groups and thereby fewer active sites on the aromatic ring for linking with e.g. formaldehyde. If unmodified lignosulfonate is condensed with formaldehyde a three-dimensional network (a resin) will certainly be obtained but it will have a limited number of linking points and therefore will be more brittle and weaker than a phenol formaldehyde resin. Furthermore, sulfonic acid groups will enhance the water swellability of the network, which means an impairment of the water resistance of the bonded product.

There have been a number of efforts by prior art workers to improve the properties of condensation products of formaldehyde and lignosulfonates. The object of our invention is to provide an improved process over what has gone before.

THE PRESENT INVENTION

We have discovered that a product of excellent properties can be produced by utilizing a two-step process for the preparation of a condensation product of lignosulfonate, phenol and formaldehyde.

The first step is an acid condensation step wherein a smaller amount of formaldehyde is caused to react with phenol and sulfite waste liquor at a temperature of at least 80°C and at addition of acid to a pH within the range of 0.2 to 4.0. This first step acid condensation is preferably carried out to the extent that at least 40 percent of the phenol is present in bound form. The reaction products are cooled.

The first step acid condensation can be carried out under pressure in an autoclave, or at atmospheric pressure. The water content of the reaction mixture in the first step is suitably 20 – 100 percent by weight of the combined weight of sulfite waste liquor and phenol.

The sulfite waste liquor can for example be unmodified sulfite waste liquor, such as spent liquor or spray-dried powder and suitably contains at least 70 percent by weight of lignosulfonate and at most 12 percent by weight of sugar, based on the dry substance. With regard to the acid pre-condensation step our hypothesis is that a good bond between lignin and phenol is obtained in the best way in the presence of formaldehyde. The acid pre-condensation is assumed to proceed according to two different courses; on the one hand a condensation between lignin and phenol to a ligno-phenol condensation product, (which is previously known in the literature), and on the other hand a condensation between built-up ligno-phenol units and formaldehyde wherein the formaldehyde is assumed to have a quite conventional function and act as a methylene donor for the building-up of high-molecular condensation products of the novolac type.

In condensation without formaldehyde a high amount of acid is required in order to obtain the condensation between lignin and phenol. When using sulfuric acid the amount of acid must for example be about 10 percent, based on the weight of sulfite waste liquor and phenol, in order to obtain a satisfactory bond between lignin and phenol. The acid present can thereby be considered to split off formaldehyde from the lignosulfonate where the formaldehyde in turn makes the above stated polycondensation between the ligno-phenol units possible.

The second step is an alkaline condensation step wherein the cooled reaction products of the first acid condensation step are further condensed under alkaline conditions at a temperature of at least 60° by adding more formaldehyde and enough alkali so that the pH exceeds 7. The water content during the second step is 40 – 60 percent by weight based on sulfite waste liquor and phenol.

In condensing sulfite waste liquor and phenol as starting materials it has now surprisingly been found that considerable advantages are gained if a smaller amount of formaldehyde is added already in the first acid pre-condensation step and the remaining required amount of formaldehyde is added in the second alkaline final-condensation step. The total required amount of formaldehyde for the best possible end-result is for example reduced from 74 percent to 50 percent by weight based on the weight of sulfite waste liquor and phenol and the alkaline step can be carried through considerably faster. The amount of acid added in the acid step can be reduced and a product quite comparable to conventional phenolic resins as binder for e.g. particleboard is obtained.

The pH in the alkaline condensation step is preferably between about 10 – 13. When preparing condensation products according to our invention for laminating uses the pH in the alkaine condensation step may be lower, i.e., within the range of about 7 – 10.

In a preferred embodiment of the process according to the present invention 10 – 60 parts by weight of sulfite waste liquor (dry content) is pre-condensed in acid medium, with 90 – 40 parts by weight of phenol, 2.5 – 30 parts by weight of formaldehyde and 20 – 100 parts by weight of water at a pH within the range of about 0.2 – 4.0, the condensation is then continued in an alkaline medium at a pH of 10 – 13 after addition of more formaldehyde and water to a total amount of formaldehyde of 30 – 75 parts by weight.

The following example illustrates the present invention more in detail.

EXAMPLES 1 – 7

Seven resins were prepared with varying compositions and under varying condensation conditions. The variables involved in the seven examples are indicated with $X_1$, $X_2$ ..., $X_n$, which are listed in table 1 and explained below.

To a reactor were first charged $X_5$ parts of water, $X_3$ parts of formaldehyde in the form of a 37 percent aqueous solution (formalin) and $X_1$ parts of phenol. The mixture was vigorously agitated and $X_2$ parts of spray-dried fermented sulfite waste liquor were charged in portions. The powder of sulfite liquor with the trade name "Pellbond F" contained 70 percent of calcium lignosulfonate and 10 percent of sugar, the rest being low molecular calcium salts.

The mixture was agitated until all of the "Pellbond F" was dissolved. $X_4$ parts of concentrated sulfuric acid were then added.

Composition and pH of the reaction mixture are shown below:

| Phenol | $X_1$ | parts |
| Pellbond F | $X_2$ | " |
| Formaldehyde | $X_3$ | " |
| Sulfuric acid | $X_4$ | " |
| Water | $X_6$ | " |
| pH | $X_7$ | |

[$X_6$ is the total amount of water i.e., $X_5$ + water from other reaction products, predominantly formalin.]

A first step acid condensation was carried out in such a way that the mixture was heated to reflux. The temperature at that point was 97°C and the time for heating from room temperature to 97°C was 30 – 45 minutes. The time at 97°C was $X_8$ min. The amount of bound phenol was determined to be $X_9$ percent.

The reaction mixture was cooled to 20°C and then $X_{10}$ parts of water and $X_{11}$ parts of formaldehyde in the form of formalin were added. Furthermore sodium hydroxide in the form of a 40 percent aqueous solution was added making the pH rise to $X_{13}$. The total water content of the mixture was $X_{14}$ parts.

The alkaline condensation step was carried out in such a way that the mixture was heated to 80°C. The heating time was about 30 min. During the course of the condensation the pH and the viscosity were checked at regular intervals, the pH being adjusted by succesive additions of sodium hydroxide in order to keep the pH within the range of 10.5 – 11 at the beginning of the condensation and 11 – 12 at the end of the condensation. The total amount of the added sodium hydroxide was $X_{12}$ parts.

The condensation was interrupted by cooling of the resin to room-temperature. The pH of the resin was $X_{15}$ and its viscosity $X_{16}$ cP (measured with a Brookfield-viscosimeter at 50 r.p.m. and at 25°C after adjustment of the water content to 60 percent.) Furthermore the so-called gelling-time was $X_{17}$ min. at 100°C with a Tecam gelling-time meter.

Example 6 was not conducted according to our invention as there was no formaldehyde present in the acid condensation step. As can be seen from the table the amount of acid is high ($X_4$) and a time of condensation of 480 min. ($X_8$) is required to get an amount of bonded phenol of 17.5 percent. This should be compared with examples 1 – 5 which followed our invention where the amount of bonded phenol exceeds 40 percent after a condensation time which is only 1/3 or lower than the condensation time when no formaldehyde is present in the acid step.

In order to evaluate the resins, particleboards were made with the resins as binders in a half-scale apparatus. As particle raw material so-called core particles were used, which had been dried to a suitable moisture content of approximately 4 percent. The particles were coated with a resin solution of a suitable dry content (40 – 50 percent) and of a suitable viscosity (90 – 180 cP) in a rotating drum. The amount of resin was 10 percent on dry basis, based on dry particles. The resins were used as such, i.e., without any addition of a supplementary curing agent or hydrophobing agent.

After the resin coating, the particles were formed into sheets and were pressed between press plates at a pressure of about 18 kp/cm² and at a press temperature 165°– 170°C. The pressing time was 10 min. The pressed particleboards were post-conditioned.

The particleboards were tested according to standard methods. All the boards had in the dry state values for flexural strength and internal bond which exceeded valid DIN-standard specifications for particleboard bonded with phenolic resins. These standard values are 180 kp/cm² for the flexural strength and 3.5 kp/cm² for the internal bond.

The internal bond of the particleboards in a wet state according to the so-called V-100 method, which involves two hours of boiling of the specimen before testing, i.e., according to the DIN-specifications 68761, sheet 3, Sept. 1967, is shown in the table below.

| Resin acc. to ex. No. | Internal bond V-100 (kp/cm²) |
|---|---|
| 1 | 2.7 |
| 2 | 2.6 |
| 3 | 2.3 |
| 4 | 1.6 |
| 5 | 1.5 |
| 6 | 0.9 |

As can be seen from the Table I the internal bond is higher for particleboard manufactured with resins prepared according to the invention in comparison with a resin prepared according to example 6.

Table 1

| Ex. No. | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ | $X_{13}$ | $X_{14}$ | $X_{15}$ | $X_{16}$ | $X_{17}$ |
|---|---|---|---|---|---|---|---|---|---|---|---|---|---|---|---|---|---|
| 1 | 50 | 50 | 20.0 | 2.6 | 14.7 | 48.7 | 2.5 | 60 | 80.0 | 73.8 | 30.0 | 22.7 | 10.8 | 158.9 | 11.5 | 100 | 86 |
| 2 | 50 | 50 | 20.0 | 2.6 | 14.7 | 48.7 | 2.5 | 30 | 71.4 | 73.8 | 30.0 | 26.2 | 10.8 | 164.0 | 11.1 | 90 | 122 |
| 3 | 50 | 50 | 6.4 | 5.1 | 49.2 | 60.2 | 1.0 | 130 | 65.0 | 35.3 | 43.6 | 31.2 | 10.7 | 156.3 | 12.2 | 95 | 126 |
| 4 | 50 | 50 | 5.0 | 2.6 | 33.9 | 42.4 | 2.5 | 120 | 40.2 | 45.9 | 45.0 | 30.5 | 10.7 | 168.4 | 11.7 | 95 | 126 |
| 5 | 40 | 60 | 20.0 | 3.1 | 14.2 | 48.2 | 1.6 | 55 | 74.1 | 73.7 | 30.0 | 26.0 | 10.7 | 163.8 | 11.2 | 100 | 86 |
| 6 | 50 | 50 | 0 | 10.2 | 24.4 | 24.6 | 0.5 | 480 | 17.5 | 45.0 | 74.0 | 39.3 | 10.7 | 229.8 | 11.6 | 98 | 40 |

EXAMPLE 8

To a reactor were charged in the following order 965 kg of water, 340 kg (4.5 kmol) formalin (40 percent aqueous solution) and 1125 kg (12 kmol) liquid phenol. Following this 1125 kg (45 bags) Pellbond F (spray-dried powder of sulfite liquor) were added in portions with very vigorous agitation.

When all of the Pellbond-powder had been dissolved the calculated amount of sulfuric acid, 110 kg concentrated, 98 percent aqueous solution, was added.

Thereafter the actual ligno-phenol condensation started. The reaction mixture was heated to boiling. The time for heating from room temperature up to reflux temperature was bout 45 min. The condensation was then continued to a viscosity of about 900 cP (Haake viscosimeter, testing device cone-plate), shear rate 5650 S⁻¹ 25°C). The total condensation time at reflux was about 2 hours, the ligno-phenol then being cooled to about 40°C. The amount of bound phenol was at that time approximately 60 percent.

550 kg water and 2330 kg (31 kmol) formalin (40 percent aqueous solution) were added for the alkaline final condensation. Following this the reaction mixture was neutralized and adjusted to a pH-level of 10.6 – 10.7 by addition of sodium hydroxid as a 43.5 percent aqueous solution. The condensation product was heated to about 80°C during a heating-time of approximately 30 min. from the starting temperature 40°C to the condensation temperature 80°C. After a total condensation-time of about 2 hours the condensation was interrupted at a Haake-viscosity of about 140 cP and pH 11.5. The prepared resin was left in the reactor for the night.

To evaluate the lignin resin a glue solution was prepared from resin (dry content 43 percent), a wax emulsion (dry content 50 percent) as hydrophobing agent and a curing-agent (potassium carbonate as a 50 percent aqueous solution).

A glue solution of 40 – 42 percent was prepared according to the following recipe:

| Composition of the glue | Surface layer (parts) | Middle layer (parts) |
|---|---|---|
| Lignin resin according to this example | 200 | 200 |
| Spg-wax-emulsion | 7.5 | 7.5 |
| Potassium carbonate | 0 | 12 |
| Water | 5 | 0 |

Particles were coated with the glue solution, prepared as above, in continuous glue machines by means of a series of spray nozzles, where the particles were kept in rotation by an agitator in order to spready the adhesive as evenly as possible over the surface of the particles. The amount of added adhesive, counted as dry, in percent of the amount of dry considered particles, was 12.3% for the surface layer and 8.8 percent for the middle layer. After the glue coating, the particles were sheeted by means of four separate particle spreading units in such a way that the surface particles were spread by the first and the last unit and the core particles spread by the intermediate units. The pressing was accomplished in a hydraulic press with eight platens and with steam-heated press plates. The pressing was carried out intermittently and without pre-pressing. The press temperature was 160°C and the pressing time was varied between 9 – 15 min. Particleboards were produced with a trimmed size of 360 × 120 cm and with a thickness of 20.5 mm before grinding. The volume weight varied between 740 – 760 kg/m³. The boards were tested unground both immediately after pressing and after a storage of 15 – 20 days.

The results are shown in the following table:

The results immediately after pressing have been included only to make evident the improvement of the values which is obtained after storing. Valid standard specifications according to DIN-specifications 68 761, Sheet 3, are 180 kp/cm² for the flexural strength; 3.5 kp/cm² for the internal bond; 1.5 kp/cm² for internal bond, V-100; 6 percent for swelling, Q 2 h; 12 percent for swelling Q 24 h; and 9 ± 3 percent for the moisture content. A comparison of the results show that particleboards bonded with lignin resin perfectly well fulfills the demands for particleboards bonded with phenolic resins according to the DIN-specifications. As sulphite waste liquor is a considerably cheaper raw material than phenol, the cost for the lignin resin according to the invention will be considerably smaller than for a conventional phenolic resin.

EXAMPLE 9

A resin was prepared according to the following and evaluated for laminating use.

To a reactor were first charged 1800 g of phenol, 1050 g of a 40 percent aqueous solution of formaldehyde and 750 g water. Sulfite waste liquor in an amount of 2,630 g dry substance was added under vigorous agitation. After adjustment of the pH to 2.5 with p-toluene sulfonic acid the mixture was heated and allowed to reflux for 30 min. The reaction mixture was then cooled to 30°C whereafter 1050 g of phenol and 500 g of a 40 percent aqueous solution of formaldehyde were added. The pH was then adjusted to 8.4 – 8.5 with an aqueous solution of sodium hydroxide and the temperature was raised to 80°C. The reaction was interrupted when a viscosity of 80 cP (according to Hoeppler) measured at 20°C, was reached. 700 ml water was distilled off under vacuum and at a temperature of about 50°C. In order to evaluate the thus obtained resin it was used to impregnate a kraft paper to a resin content of 32 – 33 percent by weight with a volatile of 7 – 8 percent of the total weight. Six sheets of phenolic film and one decorative sheet of melamine film were pressed together and the laminate was then tested for water absorption and dimensional change according to NEMA standards LD 1-2.7 and LD 1-2.8. The following results were obtained: Water absorption 10.0 percent, dimensional change 0.22 percent and 0.90 percent respectively.

We claim:

1. A two-step process for the preparation of a condensation product composed of lignosulfonate, phenol and formaldehyde,
    the first step being an acid step wherein sulfite waste liquor is condensed at a temperature of at least 80°C with phenol and formaldehyde, at a pH of 0.2 – 4.0,

| Press time min. | Flexural strength kp/cm² | Internal bond kp/cm² | Internal bond V-100 kp/cm² | Swelling Q 2 h % | Swelling Q 24 h % | Water absorption % | Moisture content % | Remarks |
|---|---|---|---|---|---|---|---|---|
| 11 | 187 | 6.5 | 0.4 | 9.7 | 14.5 | 48 | 9.8 | (1) |
| 9 | 214 | 8.1 | 2.4 | 7.0 | 10.0 | 44 | 8.3 | (2) |
| 10 | 224 | 5.4 | 1.8 | 7.1 | 10.7 | 48 | 8.3 | (2) |
| 11 | 249 | 6.1 | 1.5 | 8.5 | 12.0 | 49 | 6.7 | (2) |
| 15 | 225 | 6.7 | 2.2 | 7.6 | 11.6 | 47 | 7.5 | (2) |

(1) Boards tested immediately after pressing.
(2) Boards tested after 15 – 20 days storage.

the second step being alkaline and a continuation of said condensation at a temperature of at least 60°C after addition of more formaldehyde and alkali to a pH exceeding 7.

2. Process according to claim 1, characterized in that the sulphite waste liquor contains at least 70 percent by weight of lignosulfonate and at most 12 percent by weight of sugar.

3. Process according to claim 1, characterized in that the condensation in the acid step is carried out so far that at least 40 percent of the phenol is present in bonded form.

4. Process according to claim 1, characterized in that the water content of the mixture in the acid step is 20 – 100 percent by weight, based on sulphite waste liquor and phenol.

5. Process according to claim 1, characterized in that the water content of the mixture in the alkaline step is 40 – 60 percent by weight, based on sulphite waste liquor and phenol.

6. Process according to claim 1, characterized in that the condensation in the alkaline step is carried out so far that the viscosity of the reaction mixture is 50 – 500 cP.

7. Process according to claim 1, characterized in that 10 – 60 parts by weight of sulfite waste liquor solids in the acid step is condensed with 90 – 40 parts by weight of phenol and 2.5 – 30 parts by weight of formaldehyde in 20 – 100 parts by weight of water at a pH of 0.2 – 4.0, the condensation then being continued in the alkaline step at a pH exceeding 7 after addition of more formaldehyde and water to a total amount of formaldehyde of 30 – 75 parts by weight.

* * * * *